April 6, 1954     D. F. HASTINGS     2,674,731
POWER FAILURE INDICATOR
Filed Sept. 25, 1951
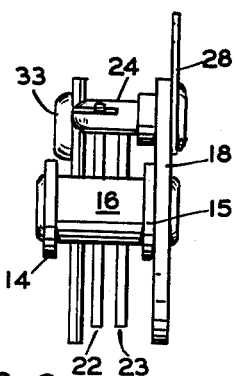
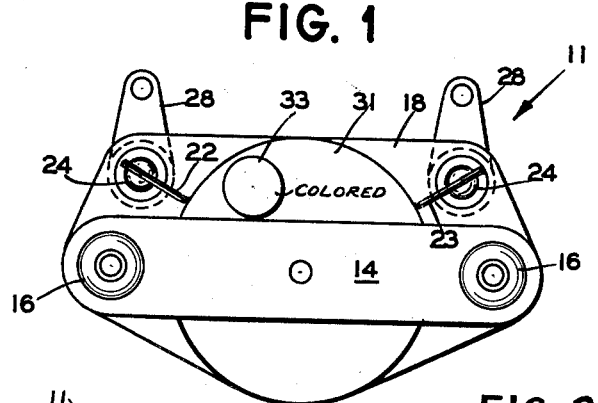
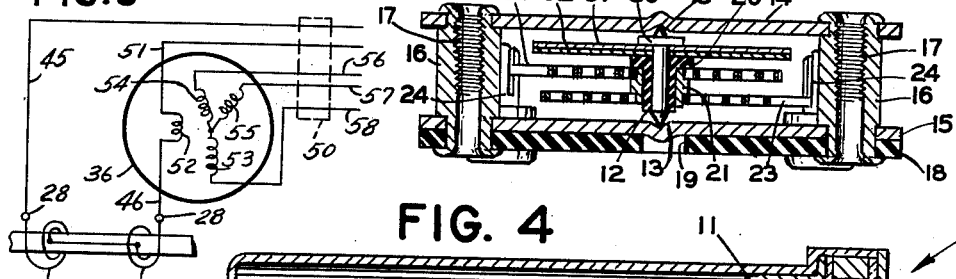
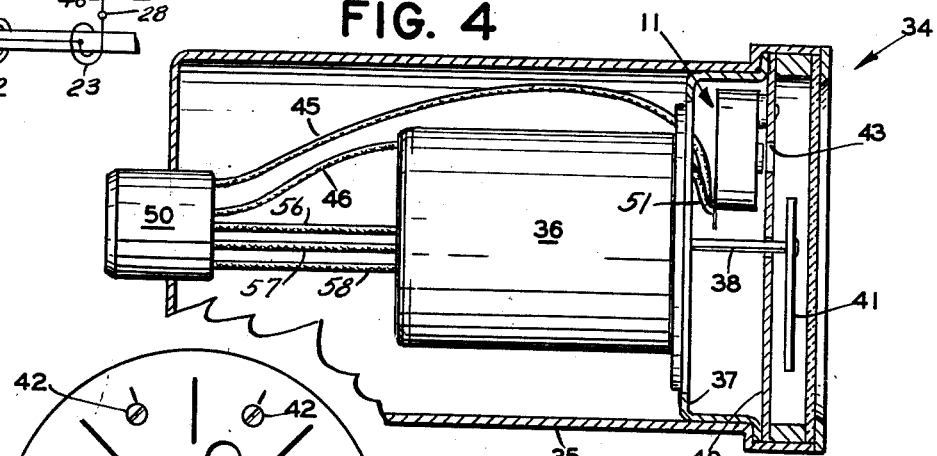
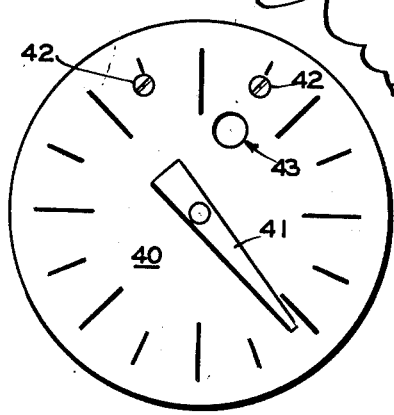
INVENTOR.
DONALD F. HASTINGS
BY
C. R. Miranda
ATTORNEY Patented Apr. 6, 1954

2,674,731

UNITED STATES PATENT OFFICE 2,674,731

POWER FAILURE INDICATOR

Donald F. Hastings, Suffern, N. Y., assignor to Bendix Aviation Corporation, Teterboro, N. J., a corporation of Delaware Application September 25, 1951, Serial No. 248,199

11 Claims. (Cl. 340—253)

The present invention relates to indicating instruments generally and more particularly to electrical instruments having provision for indicating when power is either being supplied to the instrument or when a power failure has occurred.

It is customary in electrical remote indicating and control systems to provide an indicator for determining power failure and/or power-off conditions. One type of power-off indicator customarily employed is a conventional ammeter of the D'Arsonal type connected in the power line. The meter is mounted at a point remote from the indicator, or in some cases, within the indicator instrument casing. The former location is disadvantageous where instrument panel space is limited, while the latter increases the size and weight of the indicator casing so as to be unsatisfactory where weight is at a premium, such as in aircraft.

A second type of power-off indicator, heretofore utilized, employs resilient means, usually in the form of a hairspring, for biasing the rotor shaft of a receiver indicator. When the system is operating properly, the effect of the spring is overcome so that a pointer secured to the rotor shaft operates in the usual manner. However, when power failure occurs, the pointer and rotor shaft will be returned to zero or null by the hairspring, thereby indicating power failure. The disadvantage with this type of indicator is that the use of the spring affects the accuracy of the indicator due to calibration problems.

The present invention, therefore, contemplates a novel power-off indicator which is small in size and weight, and which may be mounted inside of an instrument case without increasing the case size. The indicator comprises a pivoted staff carrying a flag disk, and two bimetal hairsprings which are electrically connected in series to the power source with their inner ends in common, but insulated from the staff. Both hairsprings have similar temperature force characteristics and are so mounted as to oppose each other as the ambient temperature changes. Furthermore, the two bimetal hairsprings are made of metals having widely varying resistance characteristics so that one hairspring has a greater resistance than the other. When current is passed through the two springs in series, the one of greater resistance reaches a much higher temperature than the other, the balance of the two springs is destroyed, and the staff and flag rotate, giving an indication of "power on." As power fails, the flag returns to its original position.

An object of the present invention, therefore, is to provide a novel power-off indicator of small size and adapted for mounting in instrument casings without increasing the size thereof.

Another object is to provide a novel power-off indicator which is self-compensated for ambient temperature changes.

Still another object is to provide a novel power-off indicator used in cooperation with an inductive receiver indicator without affecting the accuracy of the receiver.

A further object is to provide a power-off indicator having a novel hairspring arrangement wherein a pair of hairsprings are made of bimetals and arranged to oppose each other, the hairsprings having the same temperature force characteristics but widely varying electrical resistance characteristics.

A still further object is to provide a novel bimetal power-off indicator wherein a staff and a flag secured thereto are mechanically connected to but insulated from a pair of bimetal hairsprings electrically connected in series.

The above and other objects and advantages of the present invention will appear more fully hereinafter from a consideration of the detailed description which follows, taken together with the accompanying drawing wherein one embodiment of the invention is illustrated.

In the drawing, wherein like reference characters refer to like parts throughout the several views:

Fig. 1 is a top plan view of the novel bimetal power-off indicator comprising the present invention;

Fig. 2 is a front elevational view of the novel indicator of Figure 1;

Fig. 3 is a side elevation view of the novel indicator of Figure 1;

Fig. 4 is a side elevation view in section of an instrument casing which houses an inductive receiver and the novel indicator;

Fig. 5 is a front view of the instrument showing in particular the instrument dial face; and Fig. 6 is a schematic wiring diagram illustrating how the indicator and inductive receiver may be electrically connected.

Referring now to the drawing for a more detailed description of the present invention and more particularly to Figures 1 and 2, numeral 11 indicates the novel power-off indicator generally comprising a pivoted or rotatable staff 12 suitably supported for angular displacement in bearing surfaces or dimples 13 formed in an upper strap 14 and a lower strap 15. A pair of posts 16 are provided to secure together straps 14 and 15 and maintain them a predetermined distance apart. Posts 16 have internally tapped and longitudinally extending recesses 17 for a purpose to be set forth hereinafter. An insulating base panel 18, such as Bakelite, is secured to and in engagement with one face of strap 15 by the lower spun-over edges of posts 16. An opening 19 is provided in panel 18 to accommodate the dimple 13 in strap 15.

Secured to staff 12 in any suitable manner is a collar 20 which is made of "nylon" or like insulating material. Pressed onto the decreased diameter portion of collar 20 is a metallic bushing 21 which has fixed to it, as by soldering, the inner ends of a pair of opposed bimetal hairsprings 22 and 23 having approximately the same cross section and length. Hairsprings 22 and 23 are fixed at their outer ends to a pair of studs 24 supported on panel 18 and are arranged and mounted in such a manner with respect to the staff that the effect of each thereon is to maintain the staff stationary. The springs are each composed of two convoluted strips of different material having different coefficients of expansion. It is well known that when two strips of different material having different coefficients of expansion are rigidly connected together lengthwise, the body so formed will be bent under the influence of any change in ambient temperature. Each of the hairsprings is formed of materials whose force temperature constants are substantially equal. Force temperature constant is used herein as being that force, per degree change in temperature, exerted by the body which is composed of two materials having different coefficients of expansion. Thus, by making the hairsprings of materials having substantially equal force temperature constants, the forces exerted by each spring with changes in ambient temperature will be equal; and since they are opposed, the staff will remain stationary and will be compensated for temperature changes. As a result, there is no appreciable movement of the staff as the ambient temperature is varied over wide limits. The particular metals to be used in forming the hairsprings is not of importance, the main consideration is that the springs have substantially equal force temperature constants.

Means are provided for applying voltage to the hairsprings by a pair of terminals 28 (Figure 1) connected to a power source (not shown) by conductors 45 and 46 shown in Figure 4. It is apparent from the foregoing, that springs 22 and 23 are electrically connected in series inasmuch as the inner ends of the springs are secured to metallic bushing 21. According to the present invention, springs 22 and 23 are made of electrically conducting metals having widely varying resistance characteristics. In practice, one arrangement which operated satisfactorily included hairspring having ratios of resistivities of the order of 42.5:1. Of course, it may be readily appreciated that hairsprings having other ratios of resistivities may be employed as long as one spring has a greater resistance than the other. In the present embodiment, hairspring 22 is formed of materials having a greater electrical resistance than hairspring 23.

Considering the operation of the arrangement thus far described, when voltage is not applied to the springs, staff 12 will not be angularly displaced because the springs exert no turning forces thereon. With the same condition, and a change in ambient temperature, the staff will remain stationary because the force temperature constants of the springs are substantially equal and the springs exert equal and opposed turning forces on the staff. When current is passed through the two springs, spring 22, being of greater resistance than spring 23, reaches a much higher temperature and therefore, the balance of the two springs is destroyed. Under this condition, staff 12 will be angularly displaced.

Mounted on staff 12, between a collar 30 integrally formed thereon and nylon collar 20, is a metallic flag disc 31 backed by a circular insulating member 32. Formed on the upper surface of disc 31 is a protuberance 33 (Figures 1 and 3) which is painted a color to readily attract the eye of an observer. When no current is passed through the springs, protuberance 33 is in the position shown in Figure 1, but when voltage is applied to the springs protuberance 33 is displaced with the staff. It is to be noted that strap 14 limits the travel of protuberance 33 because the strap is in its path of travel.

Power-off indicator 11 is adapted for mounting in the casing of a conventional indicating instrument 34 shown in Fig. 4. The indicator 11, as mounted in the casing, is rotated 180 degrees from the position shown in Fig. 1. Indicating instrument 34 comprises a casing 35 and an inductive receiver 36 mounted on a supporting bracket 37 fixed to an indicating dial 40 and the casing. The rotor shaft 38 of the receiver passes through bracket 37 and indicating dial 40. A pointer or indicator 41 is fixed to one end of the shaft to rotate therewith relative to the dial. Power failure indicator 11 is conveniently mounted in casing 35 between bracket 37 and dial 40 and is secured to the dial by a pair of screws 42 passing through the dial and threaded into tapped recesses 17 of posts 16. Formed in dial 40 is an opening 43 which serves to reveal protuberance 33 to an observer.

In remote indicating systems utilizing an indicating instrument, such as 34, receiver 36 receives signals from a transmitter which is energized from a power source. In these systems the power-off indicator may, by way of example, be connected to the power source as follows. As shown in Fig. 6 the inductive receiver 36 is the conventional synchro which comprises three-phase stator windings 53, 54 and 55 in a Y connection with the free ends leading out by conductors 56, 57 and 58, respectively, through connector 50 for connection to the transmitter. One end of the receiver rotor winding 52 is led out via conductor 51 through connector 50 for connection to one side of the power source. The other end of rotor winding 52 is arranged for connection to the other side of the power source via the series circuit formed by conductor 46, bimetallic spiral springs 22 and 23 of the power-off indicator, and conductor 45. Under power-on conditions, the current through the above series circuit including the springs 22 and 23 causes flag disc 31 to be rotated to bring protuberance 33 out of alignment with opening 43. However, under power-off conditions, it will be understood that the current through the above series circuit will be interrupted and hence flag disc 31 will not be displaced and protuberance 33 is visible and will thereby warn an observer that power is not being supplied to the system.

From the foregoing, it is apparent that the present invention provides a power-failure indicator which takes up very little space in an indicating instrument and can be made much lighter than conventional meter movements. Furthermore, it has no permanent or wound magnets and cannot affect the calibration of the instrument to which it is attached. The present invention provides a novel indicator wherein a pair of hairsprings having widely varying resistivities are heated by the passage of electric current therethrough to angularly displace a flag disc, whereby power-on and power-off conditions may be readily ascertained. The particular metals forming the hairsprings are unimportant;

the only requirement is that one spring have a greater resistance than the other and that both have substantially equal temperature force characteristics.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A device of the kind described, comprising a pivoted staff, a pair of electrically conducting bimetal spiral springs drivably connected to said staff and having different resistance characteristics, and means for electrically connecting said springs to a power source, whereby said springs displace said staff when current is passed therethrough.

2. Means for indicating the flow of electric current in a circuit comprising a displaceable indicator, a pivoted staff supporting said indicator, a pair of bimetal members drivably connected to the staff and arranged to equally oppose each other with changes in ambient temperature to maintain the indicator in a predetermined position, said members having different resistivities, and means for electrically connecting said members in series and to a power source, said members unequally opposing each other when current is passed therethrough to effect displacement of the indicator.

3. A device of the kind described, comprising a pivoted staff, an insulating collar mounted on said staff, a metallic bushing fixedly supported on said collar, a pair of opposed electrically conducting bimetal sprial springs connected to said bushing at their inner ends and fixed at their outer ends, said springs exerting equal and opposite forces on said staff with ambient temperature changes to maintain the latter in a predetermined position, said springs having different resistivities, and means for electrically connecting the outer ends of said springs to a power source whereby the springs exert unequal forces on said staff when current is passed through said springs to thereby effect pivotal movement of the staff.

4. Means for indicating the flow of electric current in a circuit comprising a displaceable indicator, a first movable bimetal member connected for displacing the indicator in one direction, and a second movable bimetal member connected for displacing the indicator in an opposite direction, said bimetal members being similar whereby in response to ambient temperature changes their movements are equal and opposite to thereby maintain said indicator in a predetermined position, said bimetal members further constituting electrical conductors of different impedance values whereby in response to current flow through said members unequal movements thereof occur to displace said indicator.

5. In a device of the class described, an indicator, and a pair of bimetal members drivably connected to said indicator, said members responding dissimilarly to current flow therethrough and being connected in an electrical circuit to displace said indicator when current flows through said members.

6. In a device of the class described, an indicator, a pair of members drivably connected to said indicator, said members responding similarly to ambient temperature changes and maintaining said indicator in a predetermined position with changes in ambient temperature, and said members responding dissimilarly to current flow therethrough and being connected in an electrical circuit to displace said indicator when current flows through said members.

7. In a device of the class described, an indicator, a pair of bimetal members drivably connected to said indicator, said bimetal members responding similarly to ambient temperature changes and maintaining said indicator in a predetermined position with changes in ambient temperature, and said members responding dissimilarly to current flow therethrough and being connected in series with one another in an electrical circuit to a power source to displace said indicator when current flows through said members.

8. In a device of the class described, an indicator, a pair of bimetal spiral springs drivably connected to said indicator, said springs responding similarly to ambient temperature changes and maintaining said indicator in a predetermined position with changes in ambient temperature, and said bimetal spiral springs responding dissimilarly to current flow therethrough and being connected in an electrical circuit to displace said indicator when current flows through said spiral springs.

9. In a device of the class described, an indicator, a pivoted staff supporting said indicator, a pair of bimetal spiral springs connected to said staff and exerting equal and opposite torques with changes in ambient temperature to maintain said indicator in a predetermined position, and means connecting said bimetal spiral springs in an electrical circuit, said springs exerting unequal torques on said staff when said springs are energized and displacing said indicator.

10. In a device of the class described, a rotatable member, a pair of bimetal spiral springs connected to said member and having approximately the same cross section and length, said spiral springs exerting equal and opposite torques with changes in ambient temperature to maintain said member in a predetermined position, said spiral springs further constituting electrical conductors of different impedance values, and means for connecting said spiral springs in an electrical circuit, whereby in response to the flow of electric current through said spiral springs unequal torques are exerted thereby to rotate said member.

11. In a device of the class described, a pivoted staff, an electrically conducting member secured to said staff for movement therewith, a pair of bimetal spiral springs having their inner ends secured to said member and exerting equal and opposite torques with ambient temperature changes to maintain the staff in a predetermined position, said spiral springs constituting electrical conductors and having different impedance values, and means connecting the outer ends of said spiral springs in an electrical circuit, said springs exerting unequal torques on said staff when said springs are energized and displacing the staff.

References Cited in the file of this patent

UNITED STATES PATENTS

| Number | Name | Date |
| --- | --- | --- |
| 1,300,283 | Lincoln et al. | Apr. 15, 1919 |
| 1,615,664 | Warren | Jan. 25, 1927 |
| 2,570,125 | Hoare et al. | Oct. 2, 1951 |